United States Patent [19]

Timken et al.

US005685972A

[11] Patent Number: 5,685,972

[45] Date of Patent: Nov. 11, 1997

[54] PRODUCTION OF BENZENE, TOLUENE, AND XYLENE (BTX) FROM FCC NAPHTHA

[76] Inventors: Hye Kyung C. Timken, 44 N. Gerrard St.; Philip J. Angevine, 713 Maegus Dr., both of Woodbury, N.J. 08096

[21] Appl. No.: 502,733

[22] Filed: Jul. 14, 1995

[51] Int. Cl.⁶ ............................................. C10G 45/00
[52] U.S. Cl. ............................... 208/89; 208/96; 208/212
[58] Field of Search ............................. 208/89, 212, 96

[56] References Cited

U.S. PATENT DOCUMENTS

| | | | |
|---|---|---|---|
| 4,664,786 | 5/1987 | Forte et al. | 208/356 |
| 4,690,733 | 9/1987 | Forte et al. | 208/356 |
| 4,693,810 | 9/1987 | Fort et al. | 208/321 |
| 5,176,821 | 1/1993 | Forte | 208/313 |
| 5,346,609 | 9/1994 | Fletcher et al. | 208/89 |
| 5,352,354 | 10/1994 | Fletcher et al. | 208/89 |
| 5,380,425 | 1/1995 | Child et al. | 208/138 |
| 5,401,389 | 3/1995 | Mazzone et al. | 208/89 |
| 5,409,596 | 4/1995 | Fletcher et al. | 208/89 |
| 5,411,658 | 5/1995 | Chawla et al. | 208/89 |
| 5,413,696 | 5/1995 | Fletcher et al. | 208/89 |

*Primary Examiner*—Helane E. Myers
*Attorney, Agent, or Firm*—Malcolm D. Keen; Robert B. Furr, Jr.

[57] ABSTRACT

Cracked naphtha feeds such as FCC naphtha and coker naphtha are upgraded to produce chemical grade BTX (benzene, toluene, xylene with ethylbenzene) while co-producing a low sulfur gasoline of relatively high octane number. The cracked, sulfur-containing naphtha is processed by hydrodesulfurization followed by treatment over an acidic catalyst, preferably a zeolite such as ZSM-5 or zeolite beta with a hydrogenation component, preferably molybdenum. The treatment over the acidic catalyst in the second step restores the octane loss which takes place as a result of the hydrogenative treatment and results in a low sulfur gasoline product to permit a low sulfur gasoline of blending quality to be obtained with the BTX. The BTX can be extracted from the second stage effluent, preferably from a $C_6$–$C_8$ fraction of this effluent.

20 Claims, 4 Drawing Sheets

Hydrofinishing of a FCC Naphtha for BTX 5,685,972

PRODUCTION OF BENZENE, TOLUENE, AND XYLENE (BTX) FROM FCC NAPHTHA

CROSS REFERENCE TO RELATED APPLICATIONS

This application is related to prior application Ser. No. 08/850,106, filed 12 Mar., 1992, now U.S. Pat. No. 5,409,596, as well as to prior application Ser. No. 07/745,311, filed 15 Aug., 1991, now U.S. Pat. No. 5,346,609.

FIELD OF THE INVENTION

This invention relates to a process for the upgrading of hydrocarbon streams. It more particularly refers to a process for upgrading naphtha boiling range petroleum fractions containing substantial proportions of sulfur impurities to produce chemical grade benzene, toluene and xylene (BTX).

BACKGROUND OF THE INVENTION

Benzene, toluene, and xylene (BTX) are very important petrochemical raw materials for polymer and other petrochemical syntheses. The worldwide demand for BTX has grown constantly. BTX can be made by a number of different methods, for example, by synthesizis from C2 and C3 olefins or, in a refinery, by distillation and extraction from a refinery stream, typically from a reformer. Many US refineries now have BTX extraction capability in part to meet the maximum benzene level requirement for clean fuels and in part to meet the demand for BTX.

FCC naphtha contains significant amounts of aromatics and naphthenes which are precursors to aromatics. By upgrading the aromatics or aromatic precursors in FCC naphtha, it would be possible to produce BTX. The problem, however, is that significant levels of sulfur and nitrogen impurities in FCC naphtha have prevented its use for petrochemical applications. To make this upgrading feasible, removal of sulfur and nitrogen would be necessary to produce a chemical grade product and, in addition, the C6–C8 cut should contain a high concentration of BTX for efficient extractor operation. The by-product should also be attractive as a gasoline blending component.

While FCC naphtha contains a significant amount of BTX, use of the BTX for petrochemical applications is not feasible because of the high sulfur and olefin content of the naphtha. For example, it would be possible in principle to extract BTX directly from an FCC naphtha but the sulfur problem would remain even though the yield of BTX might be high and the by-product gasoline would have good octane. Hydro-desulfurization would remove the sulfur and nitrogen impurities and enable chemical grade BTX to be obtained but the by-product gasoline would not constitute a good blend component due to its low octane rating as a result of the removal of high octane olefins during the hydrogenative treatment.

This phenomenon may be illustrated by a case study on a typical FCC naphtha. If the BTX could be extracted directly from a narrow cut FCC naphtha (170°–300° F., 77° –150°C.) it would be possible to produce about 1.34 TBD BTX (including ethylbenzene, EB) from 10 TBD of a typical FCC naphtha, with the balance of 8.7 TBD being a gasoline blend component, typically of about 84 octane ((R+M)/2).

Desulfurization of the 170° F. cut (7.8 TBD out of 10 TBD) of this typical naphtha as shown in FIG. 1 of the accompanying drawings would lead to 1.41 TBD of BTX (60 bbl benzene, 500 bbl of toluene and 850 bbl of xylene and EB). The by-product gasoline comprising the 170° F.– cut together with the hydrotreated by-product (from the fractionation and extraction of the hydrotreater effluent) makes up 8.7 TBD of 73 octane gasoline, with 2.2 TBD coming from the 170°– cut (90 ON) and 6.5 TBD of a low octane hydrotreated fraction (68 (R+M)/2). While these numbers will vary depending on the feed, the trend will hold good, so that the problem of producing BTX while retaining acceptable octane for the by-product gasoline remains.

Aromatics could be increased by sending a $C_6$–$C_8$ cut of the FCC naphtha to the reformer via the reformer pre-treater, the sulfur in the naphtha needs to be removed before this scheme could be practical. BTX yields would be comparable to those achieved by the previous processing scheme.

The problem in using FCC and other sulfur-containing naphthas for BTX production is therefore that sulfur requires removal in order to produce chemical grade BTX but that hydrotreatment, the favored desulfurization technique, lowers the octane of the by-product gasoline as a result of olefin saturation. It would therefore be desirable to develop a naphtha upgrading process which enables the sulfur to be removed while retaining octane.

In U.S. Pat. Nos. 5,346,609 and 5,409,596, we have described a process for effectively desulfurizing catalytically cracked naphthas such as FCC naphtha while maintaining a high octane number. Briefly, the process comprises an initial hydrodesulfurization step which reduces the sulfur to an acceptable level, although at the expense of octane which is restored in a subsequent step by treatment over an acidic catalyst such as one based on ZSM-5, as described in U.S. Pat. Nos. 5,346,609 and 5,409,596, zeolite beta as described in Ser. No. 07/891,124 (now U.S. Pat. No. 5,413,696) or MCM-22 as described in U.S. Pat. No. 5,352,354. The use of a molybdenum-containing ZSM-5 catalyst is described in Ser. No. 08/133,403, now U.S. Pat. No. 5,411,658, and 08/133,942, now U.S. Pat. No. 5,461,389.

Reference is made to these disclosures for a detailed description of the problems of cracked naphtha desulfurization as well as of the octane-retention desulfurization processes described in those patents.

Other highly unsaturated fractions boiling in the gasoline boiling range, which are produced in some refineries or petrochemical plants, include pyrolysis gasoline and coker naphtha. Coker naphtha is a fraction which is produced by a coking process, either delayed coking, fluid coking or contact coking, all of which are well-known processes in the petroleum refining industry. See, for example, Modern Petroleum Technology, Hobson and Pohl (Ed.), Applied Science Publ. Ltd., 1973, ISBN 085334 487 6, pages 283–288, and Advances in Petroleum Chemistry and Refining, Kobe and McKetta, Interscience, N.Y. 1959, Vol. II, pages 357–433, to which reference is made for a description of these processes.

Coker naphtha, being produced by the coking of residual chargestocks, has a high sulfur content, typically at least 1,000 ppmw (0.1 percent by weight) or even higher, for example 5,000 to 10,000 ppmw (0.5 to 1.0 percent) and a low octane number, typically no higher than about 70. It is also unstable and tends to form gums by polymerization of diolefins and other unsaturated species which are present in these thermally cracked products. Although the content of unsaturates is high, with bromine numbers typically in the range of 50 to 80, there is no positive contribution to octane from the unsaturates as they are low octane components. Coker naphtha contains naphthenes which are precursors to aromatics which can be upgraded to BTX. The combination of high sulfur content and low octane makes coker naphtha an unpromising candidate for treatment by the process described in the patents referred to above, especially when the octane of the by-product gasoline is considered, a problem which is exacerbated by the high levels of sulfur.

We have now found, however, that the process described in U.S. Pat. Nos. 5,346,609 and 5,409,596 can be used for the production of BTX (with EB) while retaining an acceptable octane rating for the by-product gasoline which may be sent to the refinery gasoline pool. The present process is capable of achieving the desired objectives of BTX and gasoline production at a minimal gasoline yield-loss. A refinery which produces gasoline with excess octane due to mandated oxygenate addition and/or a refinery which has an existing BTX extraction capability would benefit most from the adoption of this process.

The present process is capable of producing a significant amount of BTX from FCC naphtha, a whole new source of BTX in a refinery, enabling BTX yield to be significantly increased. In some cases, the process can nearly double the BTX yield in a refinery. The combination of gasoline hydrofinishing, aromatization/octane restoration with an acidic zeolite catalyst and BTX extraction will maximize BTX yield; with medium and large pore zeolite catalysts, two-ring aromatics can be converted to one-ring materials to increase BTX yield. Also, naphthenes and paraffins can be dehydrogenated to aromatics and increase the BTX yield. The process is also applicable to thermally cracked feeds such as coker naphtha and other feeds containing aromatics and aromatic precursors such as the naphthenes in coker naphtha, although in these cases, the octane rating of the by-product gasoline may not be as favorable as with FCC naphtha feeds.

SUMMARY OF THE INVENTION

According to the present invention, the process for the production of chemical grade BTX (including EB) with the production of blending grade gasoline suitable for blending into the refinery gasoline pool, comprises catalytically hydrodesulfurizing a cracked petroleum fraction in the gasoline boiling range, especially FCC naphtha, coker naphtha or pyrolysis gasoline to remove sulfur to acceptable levels. The hydrotreated intermediate product is then treated, in a second stage, by contact with a catalyst of acidic functionality under conditions which convert the hydrotreated intermediate product fraction to BTX (benzene, toluene and $C_8$ aromatics, including xylene) as well as a by-product fraction in the gasoline boiling range. This product is suitable as a gasoline blending range component: under favorable conditions, it is possible to achieve an octane rating no lower than that of the feed (or of the same boiling range fraction of the feed). The sulfur content of the gasoline by-product can be reduced to levels of not more than 100 ppmw or even lower, for example, 50 ppmw.

THE DRAWINGS

DETAILED DESCRIPTION

Feed

Figure 1:
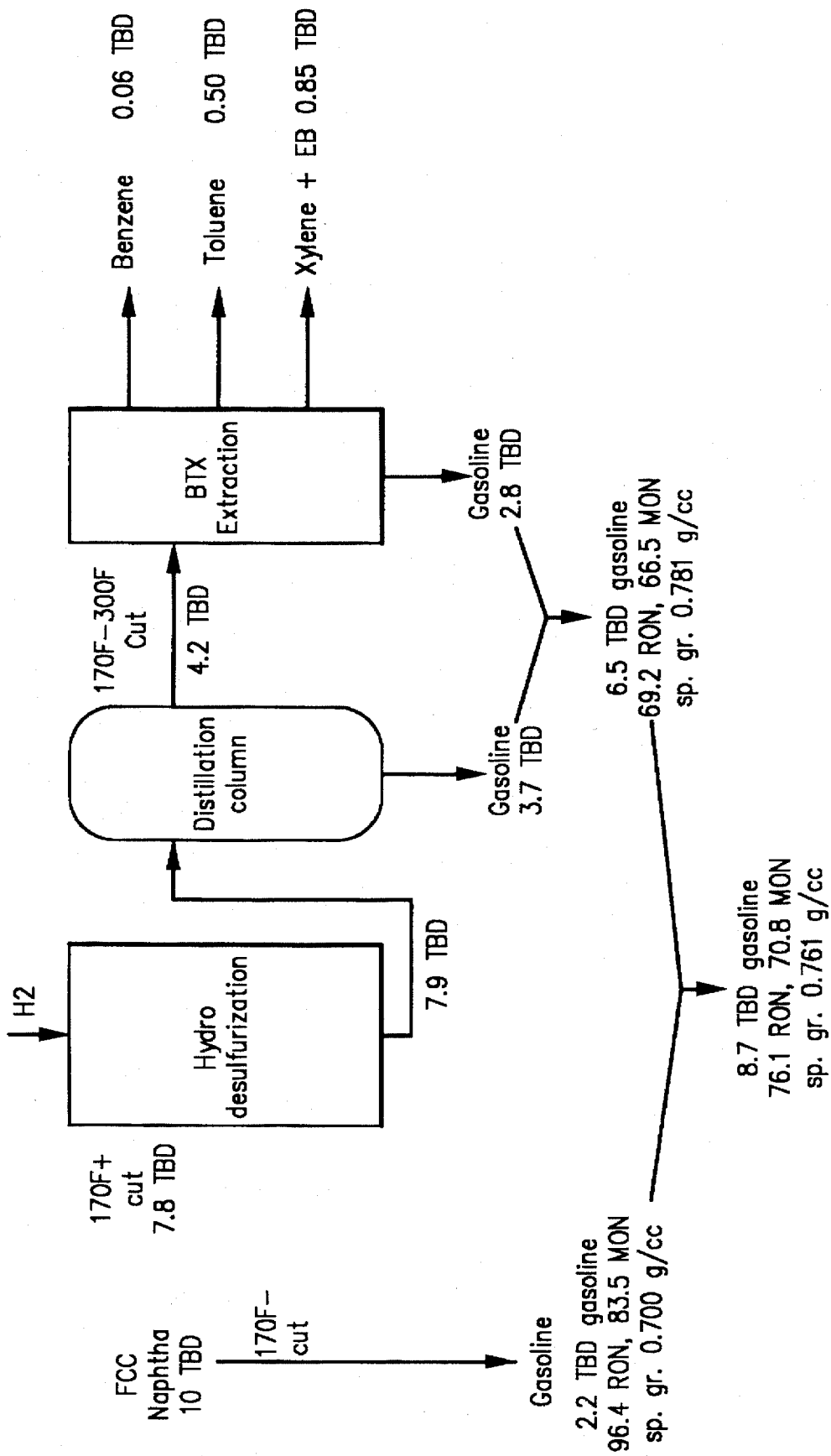
FIG. 1 is a simplified process schematic showing the BTX and gasoline yields from a naphtha hydrodesulfurization process.

The feed to the process comprises a sulfur-containing cracked naphtha. The stream may be a catalytically cracked, olefinic fraction such as FCC naphtha, as described in U.S. Pat. Nos. 5,346,609 and 5,409,596 or a thermally cracked naptha such as pyrolysis gasoline or coker naphtha, as described in co-pending application Ser. No. 08/427,512, filed 24 Apr., 1995. Reference is made to these patents and application for details of the refinery streams which may be used.

FCC naphthas may be light naphthas typically having a boiling range of about $C_6$ to 330° F., full range naphthas typically having a boiling range of about $C_5$ to 420° F. or even higher, e.g. up to about 500° F., heavy naphtha fractions boiling in the range of about 260° F. to 500° F., e.g. 330° to 500° F., preferably about 330° to 412° F., depending on the mode of operation of the FCCU and refinery requirements. The present process may be operated with the entire naphtha fraction obtained from the FCCU or, alternatively, with part of it.

The preferred thermally cracked petroleum fraction is coker naphtha although other thermally cracked feeds such as pyrolysis gasoline may also be used. Coker naphtha is obtained by thermal cracking of a residual feed in a coker. As mentioned above, coking processes are well-established in the petroleum refining industry and are used for converting residual chargestocks into higher value liquid products. The delayed coking process is in widespread use in the United States as noted above; variants of the typical delayed coking processes are described in U.S. Pat. Nos. 5,200,061; 5,258,115; 4,853,106; 4,661,241 and 4,404,092.

Coker naphthas may be light naphthas typically having a boiling range of about $C_6$ to 330° F., full range naphthas typically having a boiling range of about $C_5$ to 420° F. or even higher, e.g. up to about 500° F., heavy naphtha fractions boiling in the range of about 260° F. to 500° F., e.g. 330° to 412° F., preferably about 330° to 412° F., depending on the mode of operation of the coker fractionator (combination tower) and refinery requirements. The present process may be operated with the entire naphtha fraction obtained from the coker or, alternatively, with part of it.

The sulfur content of coker naphthas depends on the sulfur content of the feed to the coker as well as on the boiling range of the selected fraction used as the feed in the process. Lighter fractions, for example, will tend to have lower sulfur contents than the higher boiling fractions. As a practical matter, the sulfur content will normally exceed 500 or 1,000 ppmw and usually will be in excess of 2000 ppmw and in most cases in excess of about 5000 ppmw. The nitrogen content is not as characteristic of the feed as the sulfur content and is preferably not greater than about 50 ppmw although higher nitrogen levels typically up to about 150 ppmw may be found in certain naphthas. As described above, the coker naphthas are unsaturated fractions containing significant amounts of diolefins as a result of the thermal cracking.

As described in U.S. Pat. Nos. 5,346,609 and 5,409,596, the entire naphtha or a fraction of it may be used for the production of BTX by the present method; the same applies also the thermally cracked feeds such as coker naphtha. For the production of chemical grade BTX, it is prefered to use a $C_6$+ feed cut for the hydrodesulfurization/ aromatization/ octane restoration. This corresponds to a cut point of about 170° F. (about 77° C.), although cut points in the range of about 150°–180° F. (about 65°–80° C.) are suitable.

Process Configuration

The catalytic treatment of the feed over the hydrodesulfurization and acidic catalysts is carried out in the manner described U.S. Pat. Nos. 5,346,609 and 5,409,596, as are the conditions of operation and the type of catalysts which may be used. Reference is made to U.S. Pat. Nos. 5,346,609 and 5,409,596 for details of the catalysts and operating conditions. Briefly, the naphtha feed is treated in two steps by first hydrotreating the feed by effective contact of the feed with a hydrotreating catalyst, which is suitably a conventional hydrotreating catalyst, such as a combination of a Group VI and a Group VIII metal on a suitable refractory support such as alumina, under hydrotreating conditions. Under these conditions, at least some of the sulfur is separated from the feed molecules and converted to hydrogen sulfide, to produce a hydrotreated intermediate product comprising a normally liquid fraction boiling in substantially the same boiling range as the feed (gasoline boiling range), but which has a lower sulfur content than the feed.

This hydrotreated intermediate product which also boils in the gasoline boiling range (and usually has a boiling range which is not substantially higher than the boiling range of the feed), is then treated by contact with an acidic catalyst under conditions which produce a second product comprising a fraction which boils in the gasoline boiling range which has a higher octane number than the portion of the hydrotreated intermediate product fed to this second step. The product from this second step is of lower sulfur content than the feed to the hydrotreater while having a comparable or even higher octane rating as the result of the second stage treatment. The restoration of the octane which accompanies the creation of BTX aromatics permits the by-product gasoline remaining after the extraction of the BTX to be blended into the refinery gasoline pool.

Figure 2:
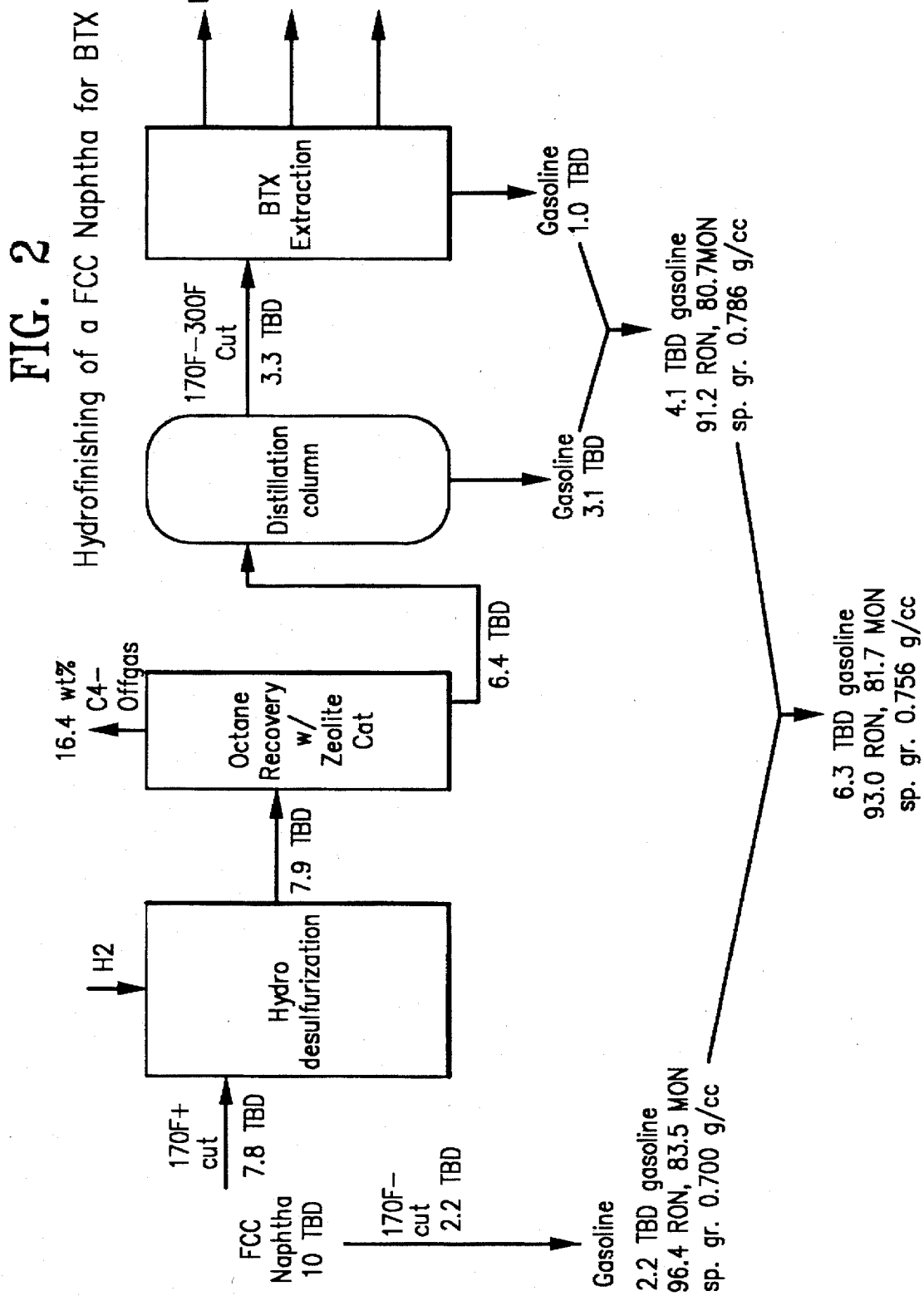
FIG. 2 is a simplified process schematic showing the BTX and gasoline yields from a naphtha hydrodesulfurization/octane recovery process.

Extraction of chemical grade BTX (including EB) may be effected by conventional extraction techniques, although an initial fractionation of the effluent may be carried out to separate a $C_6$–$C_8$ cut, approximately 170°–300° F. (about 77°–150° C.) from the effluent from the second reactor, after which the BTX (including EB) is extracted, leaving a further amount of by-product gasoline to be blended with the other gasoline fractions, as shown in FIG. 2 of the drawings, which is based on a typical refinery FCC stream at 10 TBD. As shown in FIG. 2, the initial fractionation prior to the hydrode-sulfurization produces 2.2 TBD of high octane gasoline ((R+M)/2=90, with a spread of about 13 numbers indicative of the presence of olefins). The cut from the second reactor effluent produces about 3.3 TBD of the 170°–300° F. (about 77°–150° C.) cut in which the BTX is concentrated and about 3.1 TBD gasoline by-product which is blended with the gasoline product (1.0 TBD) remaining after extraction of BTX, to give another 4.1 TBD of gasoline with an octane rating of about 86 ((R+M)/2, R/M spread 10.5). The combined gasoline by-product from the initial fractionation and the final distillation/extraction steps amounts to 6.3 TBD of an 87 octane ((R+M)/2) gasoline, as shown.

Extraction of the second reactor effluent may be carried out by conventional aromatics extraction techniques, using an aromatic-selective solvent. Extraction processes such as Udex extraction or sulfolane extraction are well-known and are described, for example, in "Chemicals from Petroleum", A. L. Waddams, 3rd. Ed., John Wiley, N.Y. 1973; "Petrochemicals", P. Wiseman, UMIST Series in Science and Technology, Ellis Horwood Ltd. (publ.), 1986; "Trends in Petroleum Technology", A. M. Brownstein, Petroleum Publ. Co. 1976. The extraction may be followed by fractionation to separate the benzene, toluene and the mixed $C_8$ components of the extracted aromatics, as is conventional.

Hydrotreated FCC naphtha is typically used in a refinery for gasoline and diesel blending components. A product from this invention can be treated similarly as a high-octane gasoline blending component. However, for a refinery with BTX extraction capability for a reformer stream, the treated product is better upgraded for additional BTX. The remaining product after the BTX extraction may be sent to the gasoline pool. Typically, coker naphtha is upgraded in a refinery at a pretreater and a reformer. By upgrading the coker naphtha with the combined HDS/zeolitic catalyst treatment, the reformer unit can be unloaded for other feeds and spared from problems associated with upgrading of coker naphtha.

Hydrotreating

The temperature of the hydrotreating step is suitably from about 500° to 850° F. (about 260° to 454° C.), preferably about 500° to 750° F. (about 260° to 400° C.) with the exact selection dependent on the desulfurization desired for a given feed and catalyst. Because the hydrogenation reactions which take place in this stage are exothermic, a rise in temperature takes place along the reactor; this is actually favorable to the overall process when it is operated in the cascade mode because the second step is one which implicates cracking, an endothermic reaction. In this case, therefore, the conditions in the first step should be adjusted not only to obtain the desired degree of desulfurization of the coker naphtha feed but also to produce the required inlet temperature for the second step of the process so as to promote the desired shape-selective cracking reactions in this step. A temperature rise of about 20° to 200° F. (about 11° to 111° C.) is typical under most hydrotreating conditions and with reactor inlet temperatures in the preferred 500° to 800° F. (260° to 427° C.) range, will normally provide a requisite initial temperature for cascading to the second step of the reaction.

Since the feeds are readily desulfurized, low to moderate pressures may be used, typically from about 50 to 1500 psig (about 445 to 10443 kPa), preferably about 300 to 1000 psig (about 2170 to 7,000 kPa). Pressures are total system pressure, reactor inlet. Pressure will normally be chosen to maintain the desired aging rate for the catalyst in use. The space velocity (hydrodesulfurization step) is typically about 0.5 to 10 LHSV ($hr^{-1}$), preferably about 1 to 6 LHSV ($hr^{-1}$). The hydrogen to hydrocarbon ratio in the feed is typically about 500 to 5000 SCF/Bbl (about 90 to 900 n.1.$1^{-1}$.), usually about 1000 to 3000 SCF/B (about 180 to 535 n.1.$1^{-1}$.) The extent of the desulfurization will depend on the feed sulfur content and, of course, on the product sulfur specification with the reaction parameters selected accordingly. It is not necessary to go to very low nitrogen levels but low nitrogen levels may improve the activity of the catalyst in the second step of the process. Normally, the denitrogenation which accompanies the desulfurization will result in an acceptable organic nitrogen content in the feed to the second step of the process; if it is necessary, however, to increase the denitrogenation in order to obtain a desired level of activity in the second step, the operating conditions in the first step may be adjusted accordingly.

The catalyst used in the hydrodesulfurization step is suitably a conventional desulfurization catalyst made up of a Group VI and/or a Group VIII metal on a suitable substrate, as described in U.S. Pat. No. 5,346,609. The Group VI metal is preferably molybdenum or tungsten and the Group VIII metal usually nickel or cobalt.

Octane Restoration—Second Step Processing

After the hydrotreating step, the hydrotreated intermediate product is passed to the second step of the process in which cracking takes place in the presence of the acidic functioning catalyst. The effluent from the hydrotreating step may be subjected to an interstage separation in order to remove the inorganic sulfur and nitrogen as hydrogen sulfide and ammonia as well as light ends but it is preferable to cascade the first stage product directly into the second step to utilize the exotherm from the hydrotreatment to supply enthalpy for the endothermic second stage treatment.

The catalyst used in the second stage of the process has a significant degree of acid activity, and for this purpose the most preferred materials are the crystalline refractory solids having an intermediate effective pore size and the topology of a zeolitic behaving material, which, in the aluminosilicate form, has a constraint index of about 2 to 12. A metal component having a mild degree of hydrogenation activity is preferably used in this catalyst.

The conditions used in the second step of the process are those which result in the generation of aromatics as well as a controlled degree of shape-selective cracking of the desulfurized, hydrotreated effluent from the first step to improve the octane of the gasoline by-product. The reactions which take place during the second step are mainly the dehydrocyclization/aromatization of paraffins to alkylbenzenes, accompanied by the aromatization of olefins; shape-selective cracking of low octane paraffins to form higher octane products, both by the selective cracking of heavy paraffins to lighter paraffins and the cracking of low octane n-paraffins also takes place, in both cases with the generation of olefins. Some isomerization of n-paraffins to branched-chain paraffins of higher octane may take place, making a further contribution to the octane of the by-product gasoline: the octane rating of the effluent from the second step will therefore be higher than that of the intermediate product as a result of the reactions taking place over the acidic catalyst in this step. The mechanism for BTX production with catalysts with hydrogenation functionality such as Mo/ZSM-5 and Mo/beta, seems to include dehydrocyclization/aromatization of paraffins to alkylbenzenes. Back-end conversion also generates BTX and improves the octane particularly with molybdenum on zeolite beta. The light FCC naphtha and coker naphtha feeds do not contain many heavy components, thus the BTX synthesis and octane improvement by Mo/beta seems to be less effective with these feeds. Results indicate that the catalyst activity and the BTX yield are sensitive to the feed properties. The Mo in Mo/ZSM-5 and Mo/beta saturates the olefins in cracked intermediates from the zeolites. Thus other metals exhibiting a hydrogenation function should be useful.

The conditions used in the second step are those which are appropriate to produce this combination of cracking and aromatization reactions. Typically, the temperature of the second step will be about 500° to 850° F. (about 260° to 455° C.), preferably about 600° to 800° F. (about 315° to 425° C.). The pressure in the second reaction zone is not critical since no hydrogenation is desired at this point in the sequence although a lower pressure in this stage will tend to favor olefin production with a consequent favorable effect on product octane. The pressure will therefore depend mostly on operating convenience and will typically be comparable to that used in the first stage, particularly if cascade operation is used. Thus, the pressure will typically be about 50 to 1500 psig (about 445 to 10445 kPa), preferably about 300 to 1000 psig (about 2170 to 7000 kPa) with comparable space velocities, typically from about 0.5 to 10 LHSV (hr$^{-1}$), normally about 1 to 6 LHSV (hr$^{-1}$). Hydrogen to hydrocarbon ratios typically of about 0 to 5000 SCF/Bbl (0 to 890 n.1.1$^{-1}$.), preferably about 100 to 2500 SCF/Bbl (about 18 to 445 n.1.1$^{-1}$.) will be selected to minimize catalyst aging.

The use of relatively lower hydrogen pressures is preferred if this can be accommodated by the constraints on the aging of the two catalysts. In the cascade mode, the pressure in the second step may be constrained by the requirements of the first but in the two-stage mode the possibility of recompression permits the pressure requirements to be individually selected, affording the potential for optimizing conditions in each stage.

The conversion to products boiling below the gasoline boiling range ($C_5-$) during the second stage is held to a minimum but higher temperatures may favor aromatization reactions for incremental BTX production.

The catalyst used in the second step of the process possesses sufficient acidic functionality to bring about the desired cracking reactions to restore the octane lost in the hydrotreating step. The preferred catalysts for this purpose are the intermediate pore size zeolitic behaving catalytic materials as exemplified by those acid acting materials having the topology of intermediate pore size aluminosilicate zeolites. These zeolitic catalytic materials are exemplified by those which, in their aluminosilicate form would have a Constraint Index between about 2 and 12, such as ZSM-5, ZSM-11, ZSM-12, ZSM-21, ZSM-22, ZSM-23, ZSM-35, ZSM-48, ZSM-50 or MCM-22, as described in U.S. Pat. No. 5,346,609. Other catalytic materials having the appropriate acidic functionality may, however, be employed. A particular class of catalytic materials which may be used are, for example, the large pore size zeolite materials which have a Constraint Index (see U.S. Pat. No. 4,016,218) of up to about 2 (in the aluminosilicate form). Zeolites of this type include mordenite, zeolite beta, faujasites such as zeolite Y and ZSM-4, with zeolite beta being prefered for the treatment of coker naphthas.

It is desirable to include a hydrogenation component in this catalyst, as described in Ser. No. 08/133,403, to which reference is made for details of molybdenum-containing acidic catalysts. Molybdenum is the preferred hydrogenation component, producing good results with both ZSM-5 and zeolite beta, as shown in the Examples below. With coker naphtha, Mo/ZSM-5 exhibits good activity for octane recovery. Product octane can be increased as high as 75 road by raising the reactor temperature. However, the yield-loss per octane is quite high. Mo/beta has lower activity for octane recovery than Mo/ZSM-5 but has a significant advantage in higher gasoline yield.

The gasoline by-product is a low sulfur (less than about 100 ppmw) which has an octane number no lower than that of the feed. Normally, the octane number of the product will be higher than that of the feed, although extraction of the BTX will lower this figure somewhat. Using FCC naphtha feeds ($C_6+$ fraction to the HDS reactor), product octane will be at least 80 (R+M)/2 and may be higher, making the product of this process a valuable blend component.

The invention is illustrated in the following Examples.

EXAMPLE 1

Preparation of a H-ZSM-5 Catalyst

A physical mixture of 65 parts ZSM-5 and 35 parts pseudoboehmite alumina powder was mulled to form a uniform mixture. All components were blended based on parts by weight on a 100% solids basis. Sufficient deionized water was added to form an extrudable paste. The mixture was auger extruded to 1/16 inch (1.6 mm) cylindrical shape extrudates and dried on a belt drier at 127° C. The extrudates were then nitrogen calcined at 480° C. for 3 hours followed by a 6 hour air calcination at 538° C. The catalyst was then steamed at 100% steam at 480° C. for approximately 4 hours.

The properties of the final catalyst are listed in Table 1, which also reports the properties of the hydrotreating catalyst used in these Examples.

EXAMPLE 2

Preparation of Mo/ZSM-5 Catalyst

A physical mixture of 80 parts ZSM-5 and 20 parts pseudoboehmite alumina powder (by weight, 100% solids basis) was mulled to form an uniform mixture and formed into 1/16 inch (1.6 mm.) cylindrical shape extrudates using a standard augur extruder. The extrudates were dried on a belt drier at 127° C. and then nitrogen calcined at 480° C. for 3 hours followed by a 6 hour air calcination at 538° C. The catalyst was then steamed at 100% steam at 480° C. for approximately 5 hours.

The steamed extrudates were impregnated with 4 wt % Mo and 2 wt % P using an incipient wetness method with a solution of ammonium heptamolybdate and phosphoric acid. The impregnated extrudates were then dried at 120° C. overnight and calcined at 500° C. for 3 hours. The properties of the final catalyst are listed in Table 1 below.

EXAMPLE 3

Preparation of a Mo/zeolite beta Catalyst (I)

A physical mixture of 65 parts zeolite beta and 35 parts pseudoboehmite alumina powder (parts by weight, 100% solids basis) was mulled to form an uniform mixture and formed into 1/16 inch (1.6 mm) cylindrical shape extrudates using a standard augur extruder. The extrudates were dried on a belt drier at 127° C. and then nitrogen calcined at 480° C. for 3 hours followed by a 6 hour air calcination at 538° C. The catalyst was then steamed at 100% steam at 480° C. for 4 hours.

The steamed extrudates were impregnated with 4 wt % Mo and 2 wt % P using an incipient wetness method with ammonium heptamolybdate and phosphoric acid solution. The impregnated extrudates were then dried at 120° C. overnight and calcined at 500° C. for 3 hours. The properties of the final catalyst are listed in Table 1.

EXAMPLE 4

Preparation of a Mo/Zeolite Beta Catalyst (II)

A physical mixture of 65 parts zeolite beta and 35 parts pseudoboehmite alumina powder was mulled with a solution of ammonium heptamolybdate and phosphoric acid (by weight, 100% solids basis excluding the metal oxide) to form a uniform extrudable mixture. The Mo solution was prepared to target 4 wt % Mo and 2 wt % P on the finished catalyst. The muller mix was then formed into 1/16 inch (1.6 mm) cylindrical shape extrudates using a standard augur extruder. The extrudates were dried overnight at 127° C., and were then nitrogen calcined at 480° C. for 3 hours followed by a 6 hour air calcination at 538° C. The catalyst was then steamed at 100% steam at 480° C. for 4 hours. The properties of the final catalyst are listed in Table 1.

TABLE 1

Physical Properties of Catalysts

| | CoMo HDS | H-ZSM-5 | Mo/ZSM-5 | Mo/Beta (I) | Mo/Beta (II) |
|---|---|---|---|---|---|
| Zeolite | — | ZSM-5 | ZSM-5 | Beta | Beta |
| Zeolite, wt. % | — | 65 | 80 | 65 | 65 |
| Alpha | — | 101 | 132* | 141* | 102 |
| Surface area, m2/g | 260 | 337 | 289 | 415 | 398 |
| n-Hexane sorption, wt % | — | 10.4 | 10.4 | 11.6 | — |
| cy-Hexane sorption, wt % | — | 9.3 | — | 14.9 | 16.3 |
| Co, wt % | 3.4 | N.A. | N.A. | N.A. | N.A. |
| Mo, wt % | 10.2 | N.A. | 3.6 | 3.8 | 3.6 |
| P, wt % | — | N.A. | 1.7 | 1.7 | 1.8 |

*Before Mo impregnation.
NA: Not applicable

EXAMPLE 5

This example illustrates BTX production by light FCC naphtha upgrading with hydrodesulfurization followed by treatment over a zeolite catalyst: H-ZSM-5 (Example 1), Mo/ZSM-5 (Example 2), and Mo/beta (Example 4). For comparison, a hydrodesulfurization with only the HDS catalyst was also carried out.

The feedstock properties are shown in Table 2 below.

TABLE 2

Properties of Naphtha Feeds

| General Properties | Full FCC[1] Naphtha | Light FCC[1] Naphtha | Heavy FCC[2] Naphtha |
|---|---|---|---|
| Nominal Boiling Range, °F. | 100–400 | 170–400 | 350–490 |
| Specific Gravity, g/cc | 0.7722 | 0.805 | 0.916 |
| Total Sulfur, wt % | 0.14 | 0.23 | 2.0 |
| Nitrogen, ppm | 76 | 86 | 180 |
| Bromine Number | 68 | 54.3 | 10.4 |
| Research Octane | 93.2 | 92.3 | 96.4 |
| Motor Octane | 81.0 | 80.3 | 84.0 |
| Benzene, wt % | 1.0 | 1.0 | 0.1 |
| Toluene, wt % | 5.0 | 6.8 | 0.9 |
| Xylene + EB, wt % | 9.0 | 11.1 | 2.7 |
| Total, wt % | 15.0 | 18.9 | 3.7 |
| Distillation, °F. (D2887, wt %) | | | |
| IBP | 56 | 135 | 231 |
| 5% | 99 | 163 | 323 |
| 10% | 125 | 191 | 360 |
| 30% | 197 | 237 | 408 |
| 50% | 261 | 287 | 442 |
| 70% | 323 | 336 | 456 |
| 90% | 397 | 404 | 491 |
| 95% | 418 | 422 | 510 |
| EP | 448 | 474 | 536 |
| Distillation, °F. (D86, vol %) | | | |
| IBP | | 95 | 166 | 194 |
| 5% | 134 | 215 | 382 |
| 10% | 146 | 227 | 394 |
| 30% | 187 | 253 | 419 |
| 50% | 240 | 287 | 435 |
| 70% | 301 | 332 | 451 |
| 90% | 369 | 381 | 476 |
| 95% | 388 | 397 | 488 |
| EP | 418 | 427 | 511 |

TABLE 2-continued

Properties of Naphtha Feeds

| General Properties | Full FCC[1] Naphtha | Light FCC[1] Naphtha | Heavy FCC[2] Naphtha |
|---|---|---|---|

Notes:
[1]The full range FCC naphtha and the light FCC naphtha (170° F.+ fraction) are from the same FCC naphtha source.
[2]A 360° F.+ fraction of a different FCC naphtha.

The experiments were carried out in a fixed-bed pilot unit employing a commercial CoMo/Al2O3 hydrodesulfurization (HDS) catalyst (Table 1) and a zeolite catalyst. Each catalyst was sized to 14/28 U.S. mesh and loaded in a reactor. The pilot unit was operated in a cascade mode where desulfurized effluent from the hydrotreating stage cascaded directly to the zeolite-containing catalyst without removal of ammonia, hydrogen sulfide, and light hydrocarbon gases. The conditions employed for the experiments included temperatures from 500°–800° F. (260° C.–427° C.), 1.0 LHSV (based on fresh feed relative to total catalysts), 3000 scf/bbl (534 n.l.1$^{-1}$.) of once-through hydrogen circulation, and an inlet pressure of 600 psig (4240 kPaa). The ratio of hydrotreating catalyst to zeolite catalyst (when used) was 1/1 vol/vol. The feed used was the 170° F.+ Light FCC Naphtha.

Table 3 below summarizes the results. The improvement in octane (without BTX extraction) is shown in FIG. 2. BTX yields of Mo/ZSM-5 and Mo/beta are plotted in FIGS. 3 and 4 as a function of reactor temperature.

co-production of gasoline with this process. The HDS and zeolite catalyst combination produces gasoline with very low sulfur (<250 ppm) and nitrogen (<10 ppm). After hydrodesulfurization, the octane of the FCC naphtha drops to about 74 road octane. With treatment over the zeolite catalyst, the octane is easily improved to the feed octane level (86.3 road octane) at 710°–770° F. reactor temperatures and at 90% gasoline yield.

At low reactor temperatures, Mo/beta exhibits higher activity in octane-improvement, while Mo/ZSM-5 exhibits higher octane-improvement activity at high reactor temperatures (FIG. 2).

Figure 3:
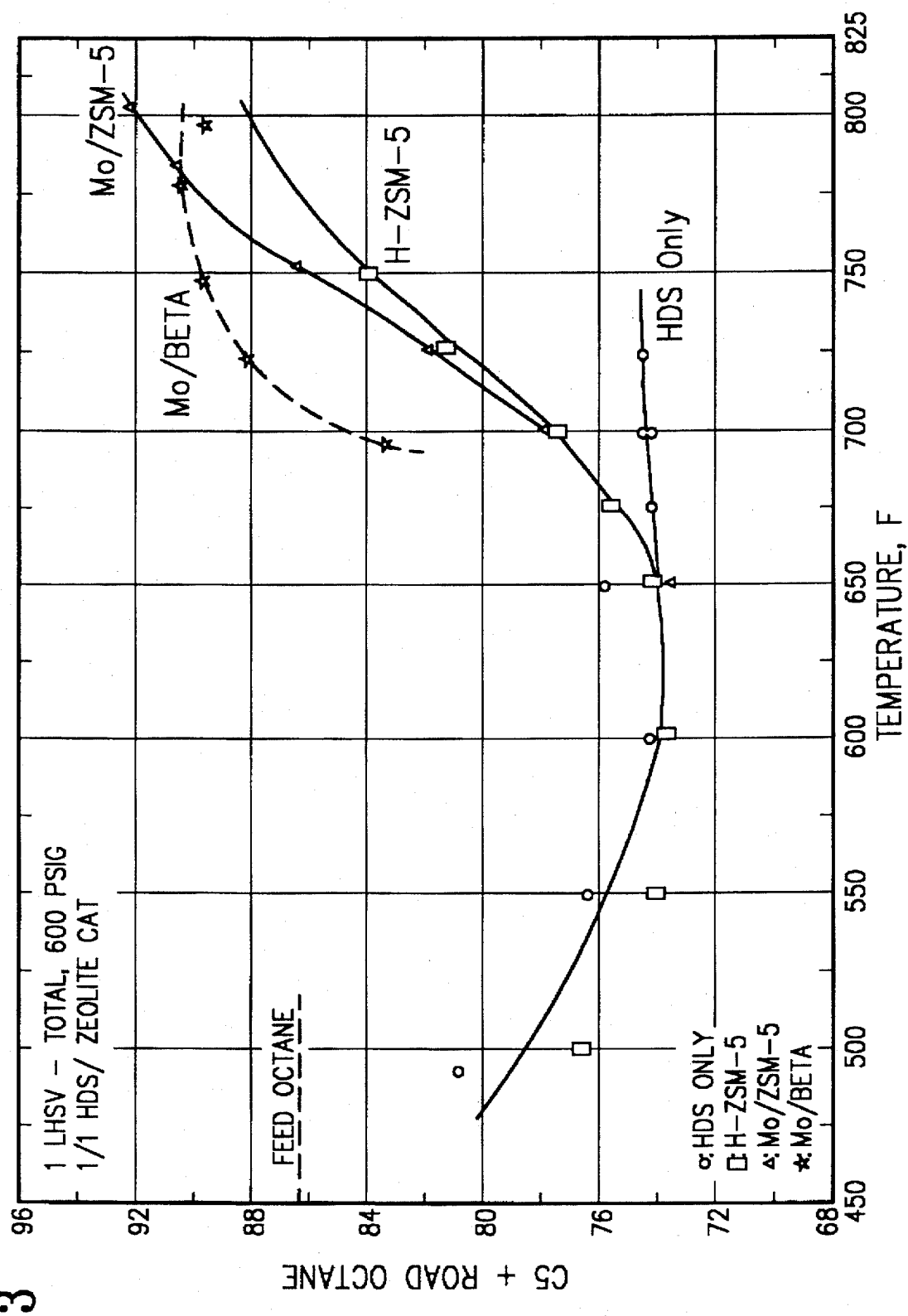
FIG. 3 is a series of plots of the octane of the treated product from the treatment of FCC light naphtha using ZSM-5 and zeolite beta catalysts, as described in the Examples.
Figure 4:
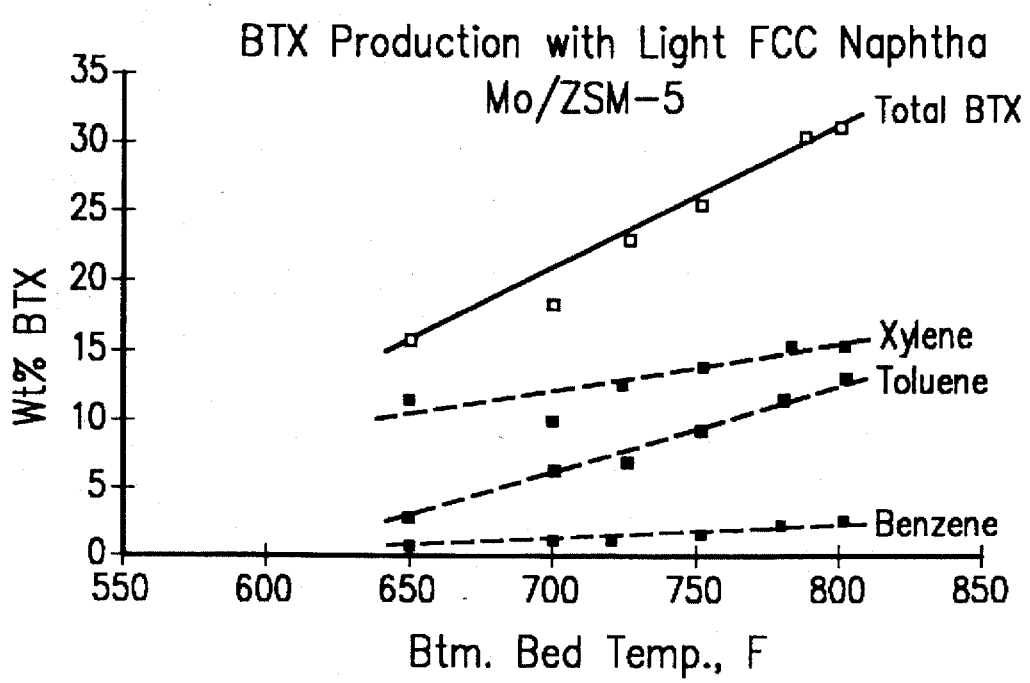
FIGS. 4 and 5 are plots of the BTX yields obtained using metal-containing zeolite catalysts in the second stage of a processing scheme, as described in the Examples.
Figure 5:
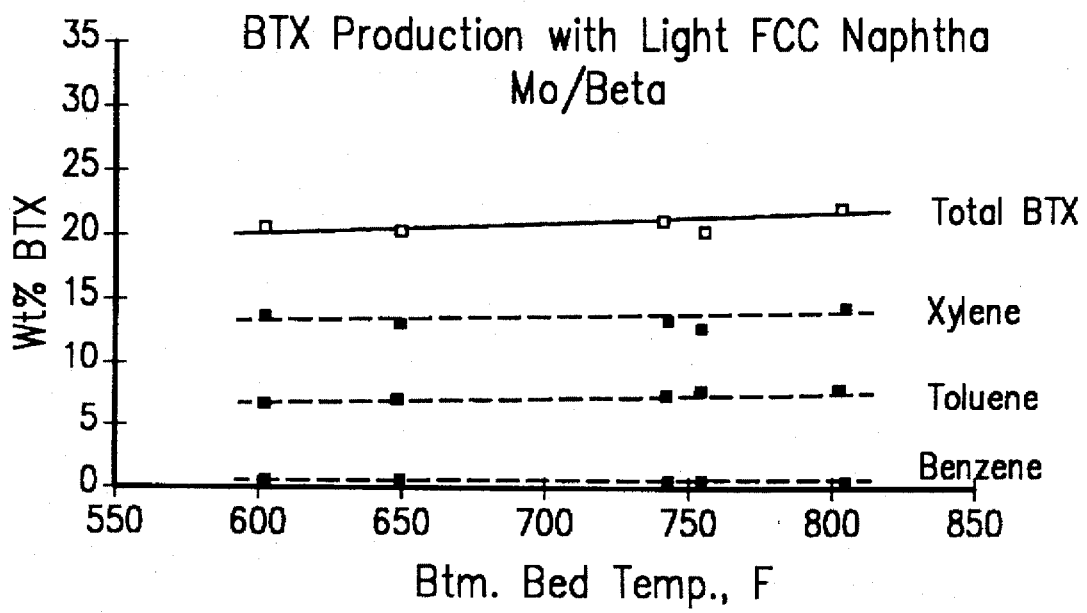

The gasoline products contain significant amounts of BTX (Table 4, FIGS. 3, 4). As the reactor temperature increases, Mo/ZSM-5 increases the yields of benzene, toluene, and xylene. At 800° F., the total BTX yield with Mo/ZSM-5 reaches 31%. Compared to Mo/ZSM-5, Mo/beta exhibits higher activity in BTX synthesis at low reactor temperatures. The BTX yields for Mo/beta are rather constant (20–25%) throughout the temperature range evaluated.

The total BTX yield using only the commercial HDS catalyst was 19.5 weight percent, relative to the 18.9 weight percent in the naphtha feed, higher than the 17.2 weight percent obtained with the HZSM-5 catalyst in the second stage but significantly below the yields obtained with the molybdenum-containing catalysts in the second stage. These yields (HDS only would translate into 60 bbl of benzene, 500 bbl of toluene and 850 bbl of xylene and ethylbenzene from a nominal 10 TBD of the full naphtha.

Compared to a similar scheme in which the BTX is extracted directly from a $C_6$–$C_8$ FCC naphtha fraction

TABLE 3

Hydrofinishing of Light FCC Naphtha for BTX Synthesis

|  | Naphtha Feed | CoMo HDS only | CoMo HDS H-ZSM-5 | CoMo HDS/ Mo/ZSM-5 | | CoMo HDS/ Mo/Beta | |
|---|---|---|---|---|---|---|---|
| Stage 1 Temp., °F. | — | 700 | 698 | 698 | 698 | 700 | 704 |
| Stage 2 Temp., °F. | — | — | 749 | 752 | 802 | 737 | 806 |
| Days on Stream | — | 9.0 | 19.8 | 6.1 | 12.0 | 15.0 | 18.0 |
| Product Analyses | | | | | | | |
| Sulfur, wt % | 0.23 | 0.02* | 0.022* | 0.004* | 0.002* | 0.003* | 0.007* |
| Nitrogen, ppm | 86 | 1* | <1* | <1* | <1* | <1* | 1* |
| C5+ Research Octane | 92.3 | 76.5 | 88.0 | 90.9 | 97.9 | 93.4 | 95.7 |
| C5+ Motor Octane | 80.3 | 72.0 | 79.8 | 82.2 | 86.5 | 83.8 | 86.2 |
| Gasoline Yield | | | | | | | |
| vol % | 100 | 101.3 | 92.6 | 92.7 | 81.5 | 82.9 | 78.4 |
| wt % | 100 | 100.0 | 92.8 | 92.7 | 83.6 | 81.4 | 77.3 |
| Process Yields, wt % | | | | | | | |
| C1–C2 | — | 0 | 0.3 | 0.3 | 1.1 | 0.4 | 0.4 |
| C3 | — | 0 | 2.7 | 2.3 | 7.1 | 3.9 | 4.8 |
| C4 | — | 0.4 | 4.7 | 4.7 | 8.1 | 15.4 | 18.5 |
| C5–330° F. | 65.9 | 67.1 | 63.3 | 66.4 | 58.5 | 62.0 | 58.9 |
| 300–390° F. | 19.1 | 19.8 | 17.3 | 15.8 | 13.8 | 11.5 | 11.0 |
| 390° F.+ | 15.0 | 13.2 | 12.1 | 10.5 | 11.3 | 7.9 | 7.5 |
| BTX Yields, wt % | | | | | | | |
| Benzene | 1.0 | 0.8 | 1.1 | 1.8 | 2.9 | 0.9 | 0.9 |
| Toluene | 6.8 | 6.9 | 5.7 | 9.7 | 13.0 | 7.2 | 7.7 |
| Xylene + EB | 11.1 | 11.8 | 10.4 | 13.8 | 15.4 | 13.8 | 14.8 |
| Total BTX + EB | 18.9 | 19.5 | 17.2 | 25.3 | 31.3 | 21.9 | 23.4 |
| H2 Consumption, scf/bbl | — | 360 | 300 | 350 | 100 | 700 | 700 |

*Measured with a H2S stripped product

The data contained in Table 4 and FIGS. 3 and 4 demonstrate the potential for BTX production with (10,000 bbl) to produce 90 bbl of benzene, 450 bbl of toluene and 800 bbl $C_8$, without hydrodesulfurization or processing over the zeolite catalyst, the present processing scheme yields 210 bbl of benzene, 940 bbl of toluene, and 1,100 bbl of xylene and ethylbenzene from the same amount of FCC naphtha. In addition, the sulfur, notrogen and olefin levels of the FCC naphtha are reduced to levels appropriate for extractor operation.

EXAMPLE 6

Hydrofinishing of Heavy FCC Naphtha for BTX Synthesis

This example illustrates the heavy FCC naphtha upgrading performance with H-ZSM-5 (Example 1), Mo/ZSM-5 (Example 2), and Mo/beta (Example 3) catalysts with co-production of low-sulfur gasoline.

The properties of the heavy FCC naphtha feedstock used in this Example are shown in Table 2. Processing was carried out as described in Example 5 above. Table 4 below summarizes the results.

EXAMPLE 7

Formation of BTX from Coker Naphtha

This example illustrates the coker naphtha upgrading performance with Mo/ZSM-5 (Example 2) and Mo/beta (Example 4) catalysts for producing low-sulfur gasoline. The feedstock properties are shown in Table 5 below. Processing was carried out as described in Example 4 above. Table 6 summarizes the results.

TABLE 5

| Properties of Coker Naphtha Feed | |
|---|---|
| Nominal Boiling Range, F. | 170–330 |
| Specific Gravity, g/cc | 0.742 |
| Total Sulfur, wt % | 0.7 |
| Nitrogen, ppm | 71 |
| Bromine Number | 72.0 |

TABLE 4

Hydrofinishing Heavy FCC Naphtha for BTX Synthesis

|  | Naphtha Feed | CoMo HDS H-ZSM-5 | CoMo HDS/ Mo/ZSM-5 | CoMo HDS/ | CoMo HDS/ Mo/Beta |
|---|---|---|---|---|---|
| Stage 1 Temp., °F. | — | 725 | 702 | 697 | 695 |
| Stage 2 Temp., °F. | — | 762 | 751 | 699 | 722 |
| Days on Stream | — | 20.4 | 12.8 | 13.0 | 14.0 |
| Product Analyses |  |  |  |  |  |
| Sulfur, wt % | 2.0 | 0.027* | 0.006* | 0.011* | 0.0065* |
| Nitrogen, ppm | 180 | <1* | <1* | 5 | 3 |
| C5+ Research Octane | 96.4 | 98.4 | 98.1 | 98.4 | 99.9 |
| C5+ Motor Octane | 84.0 | 85.4 | 85.9 | 85.3 | 87.7 |
| Gasoline Yield |  |  |  |  |  |
| vol % | — | 97.9 | 93.7 | 99.3 | 95.8 |
| wt % | — | 94.5 | 90.2 | 94.0 | 90.2 |
| Process Yields, wt % |  |  |  |  |  |
| C1–C2 | — | 0.3 | 1.3 | 0.2 | 0.3 |
| C3 | — | 1.8 | 3.3 | 1.2 | 2.3 |
| C4 | — | 2.6 | 4.5 | 3.9 | 6.8 |
| C5–390° F. | 17.7 | 35.3 | 37.9 | 43.4 | 50.5 |
| 390–420° F. | 21.1 | 18.8 | 16.8 | 17.5 | 13.4 |
| 420° F.+ | 61.2 | 40.4 | 35.5 | 32.4 | 26.3 |
| BTX Yields, wt % |  |  |  |  |  |
| Benzene | 0.1 | 2.3 | 2.4 | 1.5 | 1.7 |
| Toluene | 0.9 | 4.1 | 6.1 | 3.9 | 5.7 |
| Xylene + EB | 2.7 | 5.8 | 6.1 | 6.9 | 7.9 |
| Total BTX + EB | 3.7 | 12.2 | 14.6 | 12.3 | 15.3 |
| H2 Consumption, scf/bbl | — | 730 | 870 | 900 | 1000 |

*: Measured with a H2S stripped product

The data contained in Table 4 demonstrate the improvement of FCC naphtha product quality with this process. The HDS and zeolite catalyst combination produces gasoline with very low sulfur (<250 ppm) and nitrogen (<10 ppm). With the use of the zeolite catalysts, the octane is easily improved to the feed octane level (90.2 road octane) with high gasoline yield (>95%). Mo/beta exhibits better activity in octane-improvement with this feed than ZSM-5 (Table 5).

The heavy FCC naphtha feed contains very little BTX (<4%) but is converted to a product containing a significant amount of BTX (Table 4). For example, Mo/ZSM-5 produces ~15 wt % BTX at 750° F. and Mo/beta produces 15% BTX at 720° F. BTX yield should be expected to increase further as reactor temperature increases.

TABLE 5-continued

| Properties of Coker Naphtha Feed | |
|---|---|
| Research Octane | 68.0 |
| Motor Octane | 60.6 |
| Distillation, °F. (D2887) | |
| IBP | 70 |
| 5% | 98 |
| 10% | 138 |
| 30% | 205 |
| 50% | 254 |
| 70% | 297 |
| 90% | 341 |

TABLE 5-continued

Properties of Coker Naphtha Feed

| 95% | 351 |
|---|---|
| EP | 413 |

TABLE 6

BTX Synthesis with Coker Naphtha

|  | Naphtha Feed | CoMo, HDS/ Mo/ZSM-5 | CoMo HDS/ Mo/Beta |
|---|---|---|---|
| Stage 1 Temp., °F. | — | 701 | 702 | 707 |
| Stage 2 Temp., °F. | — | 753 | 778 | 753 |
| Days on Stream |  | 8.2 | 9.2 | 29.4 |
| Product Analyses |  |  |  |  |
| Sulfur, wt % | 0.7 | 0.006* | 0.012* | 0.019* |
| Nitrogen, ppm | 71 | <1 | 7 | 2* |
| C5+ Research Octane | 68.0 | 68.7 | 78.4 | 59.6 |
| C5+ Motor Octane | 60.6 | 66.0 | 75.0 | 59.3 |
| Gasoline Yield |  |  |  |  |
| vol % | 100 | 79.3 | 68.8 | 92.9 |
| wt % | 100 | 78.1 | 68.4 | 92.7 |
| Process Yields, wt % |  |  |  |  |
| C1–C2 | — | 1.1 | 1.2 | 0.2 |
| C3 | — | 9.0 | 9.2 | 1.3 |
| C4 | — | 12.4 | 12.3 | 5.7 |
| C5–300° F. | 71.3 | 61.7 | 52.0 | 69.7 |
| 300° F.+ | 28.7 | 16.4 | 16.4 | 23.0 |
| BTX Yields, wt % |  |  |  |  |
| Benzene | 0.6 | 0.3 | 0.5 | 0.2 |
| Toluene | 1.7 | 1.7 | 3.0 | 1.6 |
| Xylene + EB | 2.8 | 3.2 | 5.0 | 3.7 |
| Total BTX + EB | 5.1 | 5.2 | 8.5 | 5.5 |
| H2 Consumption, scf/bbl | — | 600 | 800 | 330 |

*Measured with a H2S stripped product
Conditions: 600 psig, 3000 scf/bbl, 1.0 overall LHSV.

The data contained in Table 5 demonstrate the improvement of coker naphtha product quality with this process. The HDS and zeolite catalyst combination produces gasoline with very low sulfur (<200 ppm) and nitrogen (<10 ppm). After hydrodesulfurization, the octane of the coker naphtha drops to about 45 road octane. With Mo/ZSM-5, feed octane is easily recovered at about 750° F. reactor temperature. By increasing reactor temperatures, Mo/ZSM-5 can further increase the octane level of the coker naphtha. For example, Mo/ZSM-5 produces desulfurized gasoline with 77 road octane at 778° F. reactor temperature. With Mo/beta, the octane loss up to about 60 road octane (Table 6) can be recovered. Mo/beta has an advantage in higher gasoline volume yield compared to Mo/ZSM-5. The overall number of octane-barrels is higher with the Mo/beta catalyst.

The coker naphtha feed contains about 5% BTX, which is increased on processing (Table 6). For example, Mo/ZSM-5 produces 8.5 wt % BTX at 778° F. and Mo/beta produces 5.5% BTX at 753° F. BTX yield will be expected to increase further as the reactor temperature increases.

We claim:

1. A process for producing BTX from a cracked, sulfur-containing naphtha petroleum fraction boiling in the gasoline boiling range, while upgrading the feed to produce a gasoline fuel basestock, which process comprises:

contacting the sulfur-containing feed fraction with a hydrodesulfurization catalyst in a first reaction zone, operating under a combination of elevated temperature, elevated pressure and an atmosphere comprising hydrogen, to produce an intermediate product comprising a normally liquid fraction which has a reduced sulfur content and a reduced octane number as compared to the feed;

contacting the gasoline boiling range portion of the intermediate product in a second reaction zone with a catalyst of acidic functionality to convert it to an effluent comprising a fraction boiling in the gasoline boiling range having a higher octane number than the gasoline boiling range fraction of the intermediate product, extracting benzene, toluene and $C_8$ aromatics from the effluent while forming as a by-product, a gasoline boiling range product.

2. The process as claimed in claim 1 in which the feed fraction comprises a catalytically cracked petroleum fraction.

3. The process as claimed in claim 2 in which the feed fraction comprises a FCC naphtha having a boiling range within the range of $C_6$ to 420° F.

4. The process as claimed in claim 1 in which the feed fraction comprises a FCC naphtha fraction a boiling range within the range of $C_5$ to 330° F.

5. The process as claimed in claim 1 in which the feed fraction comprises a FCC naphtha fraction a boiling range within the range of 300° to 500° F.

6. The process as claimed in claim 1 in which the feed fraction comprises a thermally cracked petroleum fraction.

7. The process as claimed in claim 6 in which the thermally cracked petroleum fraction comprises a coker naphtha.

8. The process as claimed in claim 2 in which the feed fraction comprises a coker naphtha having a boiling range within the range of $C_6$ to 420° F.

9. The process as claimed in claim 1 in which the feed fraction comprises a coker naphtha fraction a boiling range within the range of $C_5$ to 330° F.

10. The process as claimed in claim 1 which the acidic catalyst comprises an intermediate pore size zeolite.

11. The process as claimed in claim 10 in which the intermediate pore size zeolite has the topology of ZSM-5.

12. The process as claimed in claim 10 in which the intermediate pore size zeolite is in the aluminosilicate form.

13. The process as claimed in claim 10 in which the acidic catalyst includes a metal component having hydrogenation functionality.

14. The process as claimed in claim 1 in which the hydrodesulfurization is carried out at a temperature of about 500° to 800° F., a pressure of about 50 to 1500 psig, a space velocity of about 0.5 to 10 LHSV, and a hydrogen to hydrocarbon ratio of about 500 to 5000 standard cubic feet of hydrogen per barrel of feed.

15. The process as claimed in claim 1 in which the second stage upgrading is carried out at a temperature of about 600° to 850° F., a pressure of about 50 to 1500 psig, a space velocity of about 0.5 to 10 LHSV, and a hydrogen to hydrocarbon ratio of about 0 to 5000 standard cubic feet of hydrogen per barrel of feed.

16. The process as claimed in claim 12 in which the second stage upgrading is carried out at a temperature of about 650° to 800° F., a pressure of about 300 to 1000 psig, a space velocity of about 1 to 3 LHSV, and a hydrogen to hydrocarbon ratio of about 100 to 3000 standard cubic feet of hydrogen per barrel of feed.

17. The process as claimed in claim 1 in which the feed comprises an FCC $C_6$+ naphtha and the gasoline by-product has an octane rating of at least 80 (R+M)/2.

18. A process of upgrading a sulfur-containing, catalytically cracked naphtha feed fraction boiling in the range from $C_5$ to 500° F. and having a sulfur content of at least 500 ppmw to form BTX with co-production of a motor gasoline fuel having an octane number ((R+M)/2) of at least 80, which comprises:

fractionating the naptha to form a $C_6+$ fraction, hydrodesulfurizing the $C_6+$ fraction of the sulfur-containing cracked naphtha feed, over a hydrodesulfurization catalyst in a hydrodesulfurization zone, operating under a combination of elevated temperature, elevated pressure and an atmosphere comprising hydrogen, to produce an intermediate product comprising a normally liquid fraction which has a reduced sulfur content compared to the feed;

contacting the gasoline boiling range portion of the intermediate product in a second reaction zone with a catalyst of acidic functionality comprising a molybdenum hydrogenation component and a zeolitic component, to convert it to an effluent comprising a fraction boiling in the gasoline boiling range having a higher octane number than the gasoline boiling range fraction of the intermediate product.

extracting benzene, toluene and $C_8$ aromatics from the effluent while forming as a by-product, a gasoline boiling range product having an octane rating of at least 80 (R+M)/2 and a sulfur content of not more than 100 ppmw.

19. The process as claimed in claim 18 in which the zeolitic component comprises ZSM-5 in the aluminosilicate form.

20. The process as claimed in claim 18 in which the zeolitic component comprises zeolite beta in the aluminosilicate form.

* * * * *